United States Patent
Charles et al.

(10) Patent No.: US 11,797,312 B2
(45) Date of Patent: Oct. 24, 2023

(54) SYNCHRONIZATION OF MULTI-PATHING SETTINGS ACROSS CLUSTERED NODES

(71) Applicant: EMC IP Holding Company LLC, Hopkinton, MA (US)

(72) Inventors: Peniel Charles, Bangalore (IN); Manikandan Sethuraman, Bangalore (IN); Gopinath Marappan, Coimbatore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 227 days.

(21) Appl. No.: 17/186,379

(22) Filed: Feb. 26, 2021

(65) Prior Publication Data

US 2022/0276874 A1 Sep. 1, 2022

(51) Int. Cl.
*G06F 9/4401* (2018.01)
*G06F 13/40* (2006.01)

(52) U.S. Cl.
CPC ........ *G06F 9/4411* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,778,157 B1 * | 8/2010 | Tawri | H04L 45/28 370/216 |
| 7,809,912 B1 | 10/2010 | Raizen et al. | |
| 7,818,428 B1 | 10/2010 | Lavallee et al. | |

(Continued)

FOREIGN PATENT DOCUMENTS

CN 103677927 B 2/2017
EP 1117028 A2 7/2001
(Continued)

OTHER PUBLICATIONS

Kris Piepho, "Dell EMC SC Series Storage: Microsoft Multipath I/O." Dell EMC Best Practices, Jan. 2017, 57 pages.

(Continued)

*Primary Examiner* — Idriss N Alrobaye
*Assistant Examiner* — Dayton Lewis-Taylor
(74) *Attorney, Agent, or Firm* — Ryan, Mason & Lewis, LLP

(57) ABSTRACT

An apparatus comprises a processing device configured to receive multi-pathing settings from a plurality of nodes of one or more clusters, and to identify at least one group of the plurality of nodes belonging to a same cluster of the one or more clusters. The processing device is further configured to identify a master node of the at least one group of nodes, and to deliver at least a portion of the multi-pathing settings of the master node to one or more remaining nodes of the at least one group of nodes.

20 Claims, 4 Drawing Sheets

(56) References Cited

U.S. PATENT DOCUMENTS

| | | |
|---|---|---|
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,751,698 B1 * | 6/2014 | Sachdev ............ G06F 11/0781 710/16 |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,229,656 B1 * | 1/2016 | Contreras ............... G06F 3/067 |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0031594 A1 * | 2/2006 | Kodama ............ G06F 11/2069 710/5 |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0083417 A1 * | 3/2017 | Kawaguchi ......... G06F 11/1658 |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMWARE, "Multipathing Configuration for Software ISCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393, filed in the name of Vinay G. Rao et al. on Nov. 27, 2019, and entitled "Automated Seamless Migration of Logical Storage Devices.".

U.S. Appl. No. 16/710,828, filed in the name of Amit Pundalik Anchi et al. on Dec. 11, 2019, and entitled "Automated Seamless Migration with Signature Issue Resolution.".

* cited by examiner

SYNCHRONIZATION OF MULTI-PATHING SETTINGS ACROSS CLUSTERED NODES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. The storage ports are typically limited in number and each has limited resources for handling IO operations received from the host devices. Different ones of the host devices can run different applications with varying workloads and associated IO patterns. Such host devices also generate additional IO operations in performing various data services such as replication and migration so as to meet business continuity requirements.

SUMMARY

Illustrative embodiments provide techniques for synchronizing multi-pathing software settings across nodes of a cluster. For example, in one or more embodiments, such synchronization is performed using a management appliance, which can manage and apply settings between host devices in a cluster environment.

In one embodiment, an apparatus comprises a processing device configured to receive multi-pathing settings from a plurality of nodes of one or more clusters, and to identify at least one group of the plurality of nodes belonging to a same cluster of the one or more clusters. The processing device is further configured to identify a master node of the at least one group of nodes, and to deliver at least a portion of the multi-pathing settings of the master node to one or more remaining nodes of the at least one group of nodes.

According to one or more embodiments, a cluster environment comprises multiple host devices (also referred to herein as "nodes") that work together to prevent or reduce downtime and deliver increased availability of services. Nodes of a cluster can be redundant so that in the event of a failure of one node, another node of the cluster can take over the operations of the failed node. Multi-pathing software can support cluster environments and manage cluster failover scenarios.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
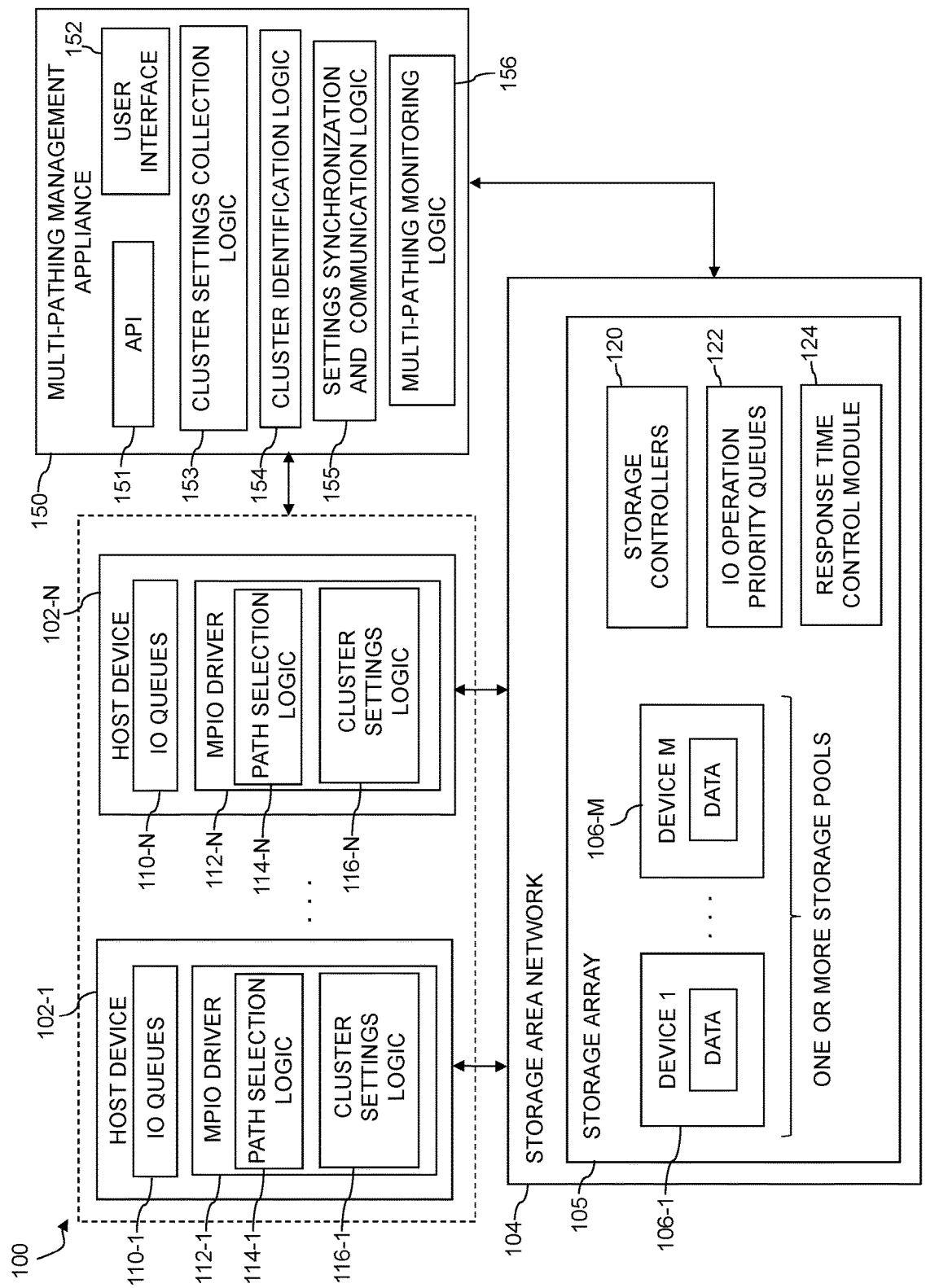
FIG. 1 is a block diagram of an information processing system configured with a multi-path layer of a host device and a multi-pathing management appliance with functionality for managing multi-pathing settings in a cluster environment in an illustrative embodiment.

FIG. 1 shows an information processing system 100 configured in accordance with an illustrative embodiment. The information processing system 100 comprises a plurality of host devices 102-1, . . . 102-N. The host devices 102 communicate over a storage area network (SAN) 104 with at least one storage array 105, and with at least one multi-pathing management appliance 150. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are examples of what is more generally referred to herein as a "storage system." This storage system in the present embodiment is shared by the host devices 102, and is therefore also referred to herein as a "shared storage system."

The information processing system 100 further comprises a multi-pathing management appliance 150. The multi-pathing management appliance 150 communicates over SAN 104 and/or another network with the host devices 102 and the storage array 105.

The host devices 102 and the multi-pathing management appliance 150 illustratively comprise respective computers, servers or other types of processing devices. The host devices 102 are capable of communicating with the storage array 105 of the SAN 104 and with the multi-pathing management appliance 150. For example, at least a subset of the host devices 102 and the multi-pathing management appliance 150 may be implemented as respective virtual machines of a compute services platform or other type of processing platform. The host devices 102 and the multi-pathing management appliance 150 in such an arrangement illustratively provide compute services such as execution of one or more applications on behalf of each of one or more users associated with respective ones of the host devices 102 and the multi-pathing management appliance 150.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement LUNs configured to store objects for users associated with the host devices 102. These objects can comprise files, blocks or other types of objects. The host devices 102 interact with the storage array 105 utilizing read and write commands as well as other types of commands, such as, for example, log select and log sense commands described further herein, that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to respective ones of the host devices 102 on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104, storage array 105 and multi-pathing management appliance 150 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage array 105, and the multi-pathing management appliance 150 may be implemented on respective distinct processing platforms, although numerous other arrangements are possible. For example, in some embodiments at least portions of the host devices 102, the storage array 105, and the multi-pathing management appliance 150 are implemented on the same processing platform. For example, the storage array 105 can therefore be implemented at least in part within at least one processing platform that implements at least a subset of the host devices 102. In another example, the multi-pathing management appliance 150 can therefore be implemented at least in part within at least one processing platform that implements at least a subset of the host devices 102.

The SAN 104 and/or any additional network noted herein (e.g., network(s) connecting the multi-pathing management appliance 150 to the host devices 102) may be implemented using multiple networks of different types to interconnect system components, including storage system components. For example, the SAN 104 and/or any additional network may comprise a portion of a global computer network such as the Internet, although other types of networks can be part of the SAN 104 and/or the additional network, including a wide area network (WAN), a local area network (LAN), a satellite network, a telephone or cable network, a cellular network, a wireless network such as a WiFi or WiMAX network, or various portions or combinations of these and other types of networks. The SAN 104 and/or any additional network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. The multi-path layer provides functionality for managing multi-pathing settings in a cluster environment. Such functionality is provided at least in part using respective instances of path selection logic 114-1, . . . 114-N, and respective instances of cluster settings logic 116-1, . . . 116-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for managing multi-pathing settings in a cluster environment. Other types of MPIO drivers from other driver vendors may be suitably modified to incorporate functionality for managing multi-pathing settings in a cluster environment as disclosed herein. The term "MPIO driver" as used herein is intended to be broadly construed, and such a component is illustratively implemented at least in part as a combination of software and hardware. For example, MPIO driver 112-1 can comprise one or more software programs running on a hardware processor of host device 102-1.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105, with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105, or other types of functions, such as log sense commands to send requests to the storage array 105 for data corresponding to performance of one or more switch fabrics in the SAN 104. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, log select and log sense commands as described herein, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path. The term "notification" as used herein is intended to be broadly construed, so as to encompass, for example, a wide variety of different types of commands, alerts, messages or other information that may be conveyed between devices.

As is apparent from the foregoing, MPIO driver 112-1 of host device 102-1 is configured to control delivery of IO operations from the host device 102-1 to the storage array 105 over selected paths through the SAN 104.

The MPIO driver 112-1 of the host device 102-1 illustratively has connectivity to the multi-pathing management appliance 150. The multi-pathing management appliance 150 in some embodiments implements PowerPath® Management Appliance (PPMA) functionality to obtain access to the host devices 102 and the storage array 105. The multi-pathing management appliance 150 utilizes one or more application programming interfaces (APIs) 151 (e.g., REST API) to interface with host devices 102 and the storage array 105, and to retrieve content from the MPIO driver 112-1.

In illustrative embodiments, multiple host devices 102 comprise nodes of a cluster. MPIO drivers 112 configured with cluster settings logic 116 are installed on all clustered nodes. Using the cluster settings logic 116, each node (e.g., host devices 102) collects its multi-pathing software settings, and a cluster identifier associated with that device, and delivers the collected multi-pathing software settings and cluster identifier to the multi-pathing management appliance 150. A cluster identifier comprises, for example, a unique cluster name of a cluster to which a given host device belongs. For example, the host device 102-1 sends its collected settings and cluster identifier to the multi-pathing management appliance 150.

The multi-pathing management appliance 150 includes cluster settings collection logic 153 to process and organize received multi-pathing settings and cluster identifiers. Cluster identification logic 154 groups all host devices 102 with the same cluster identifier (e.g., cluster name) as belonging to a given cluster. For example, in some cases, a first group of host devices 102 (e.g., 10 host devices, but can be more or less than 10) belongs to a first a cluster, and second group of host devices 102 (e.g., 10 host devices) belongs to a second cluster. In this case, based on the same cluster identifier being received from each of the host devices 102 of the first group, the cluster identification logic 154 identifies the first group of host devices as belonging to a first cluster. Based on the same cluster identifier being received from each of the host devices 102 of the second group (the cluster identifier of the second group being different from the cluster identifier of the first group), the cluster identification logic 154 identifies the second group of host devices as belonging to a second cluster. In different cases, there may be one cluster or more than two clusters of host devices 102. In one or more embodiments, the cluster identification logic 154 generates a table including mappings outlining the respective nodes (e.g., host devices 102) and their corresponding clusters.

Using settings synchronization and communication logic 155, the multi-pathing management appliance 150 identifies a master node for each cluster. In one or more embodiments, a user via a user interface 152 to the multi-pathing management appliance 150 specifies which of the host devices 102 is to be a master node for a given cluster, and the multi-pathing management appliance 150 identifies a master node based on the user's designation. Alternatively, the multi-pathing management appliance 150 selects a master node from a plurality of nodes in a given cluster. Using the settings synchronization and communication logic 155, the multi-pathing management appliance 150 delivers the multi-pathing settings of the master node to remaining nodes of a given cluster. This process can be performed by the multi-pathing management appliance 150 for multiple clusters of host devices 102.

In one or more embodiments, the multi-pathing settings collected by the cluster settings logic 116-1 and received by the multi-pathing management appliance 150 from respective ones of the plurality of nodes comprises a mapping of respective ones of a plurality of storage devices 106 of the storage array 105 to respective ones of a plurality of pseudo storage device names. For example, an MPIO driver 112-1, more particularly, the cluster settings logic 116-1, creates aliases (e.g., pseudo names) in place of the actual device identifiers for recognized storage devices 106 (e.g., LUNs) of the storage array 105. As an example, storage devices 106 may each correspond to Symmetrix and logical device identifiers, and a world-wide name (WWN). Instead of these identifiers, the MPIO driver 112-1 assigns a pseudo name to each storage device 106, such as, for example, emcpowera, emcpowerb, emcpowerc, etc. for first, second, third, etc. storage devices 106. The MPIO drivers 112 of each of the host devices 102 generate pseudo names for each recognized storage device 106 and a mapping of respective ones of the storage devices 106 to their corresponding pseudo name. The mapping may set forth details of one or more actual device identifiers (e.g., Symmetrix and logical device identifiers and/or a world-wide name (WWN)) corresponding to a pseudo name. The mapping may be, for example, in tabular form.

Situations arise where different host devices 102 of a cluster assign different pseudo names to the same storage device 106. If there is inconsistency between pseudo names between multiple host devices 102 of a cluster, problems occur during failover and retry situations where IO operations on one or more paths fail and are retried. A mismatch between pseudo names causes confusion between host devices 102 regarding which storage device 106 is the subject of an IO operation, leading to challenges and application downtime. Using the settings synchronization and communication logic 155, the multi-pathing management appliance 150 delivers the multi-pathing settings of a master node of a cluster to all of the nodes in the cluster. For example, the multi-pathing management appliance 150 delivers the storage device to pseudo name mappings of a master host device 102 to each of the host devices 102 in a cluster. Upon receipt of the master node multi-pathing settings, each MPIO driver 112 in the cluster, using the cluster settings logic 116, applies the master node multi-pathing settings on its corresponding host device 102 so that the multi-pathing settings, including the storage device to pseudo name mappings, are consistent across all of the host devices 102 of a cluster. In one or more embodiments, the multi-pathing settings collected by the cluster settings logic 116-1 and received by the multi-pathing management appliance 150 from respective ones of the plurality of nodes further comprise an IO operation policy, a failover policy and/or a load balancing policy associated with a given MPIO driver 112 of a host device 102. The master node multi-pathing settings delivered and applied to the host devices 102 of a given cluster may further comprise one or more of the aforementioned policy settings so that IO operation policies may be consistent between nodes of a cluster to avoid inconsistent operation between cluster nodes.

In illustrative embodiments, multi-pathing monitoring logic 156 of the multi-pathing management appliance 150 communicates with the host devices 102 in a cluster to determine whether one or more target ports in the storage array 105 is in standby mode. For example, a user may provide an input to a host device 102-1 indicating that one or more target ports in the storage array 105 is in standby mode. In response to the user input, the cluster settings logic 116-1 of the host device 102-1 updates a status of the one or more target ports to standby mode. The placement of a target port into standby mode may be due to, for example, maintenance on or a problem associated with the one or more target ports. According to an embodiment, the multi-pathing management appliance 150 is configured to poll each of the host devices 102 in a cluster at given intervals to gather updated information on the status of target ports in the system 100. Upon gathering such information, the setting synchronization and communication logic 155 sends notifications to respective nodes (e.g., host devices 102) in a cluster that the one or more target ports is in standby mode. The cluster settings logic 116 of each of the host devices 102 updates a status of the one or more target ports to standby mode responsive to the notification.

In one or more embodiments, a user via the user interface 152 can directly input to the multi-pathing management appliance 150 an indication that one or more target ports of a storage array 105 is in standby mode, which will trigger the settings synchronization and communication logic 155 to send notifications to respective nodes in the cluster that the one or more target ports is in standby mode. The user interface 152 may comprise a browser-based graphical user interface accessible to a user, such as, for example, an administrator. In addition to the other operations described herein, a user may also utilize the user interface 152 to view summaries and statuses of IO operation paths, and of host devices 102 and storage devices 106 and their components.

According to one or more embodiments, the multi-pathing monitoring logic 156 of the multi-pathing management appliance 150 communicates with the storage array 105 and/or host devices 102 to detect when storage devices 106 (e.g., LUNs) are added to the storage array 105. In response to detecting additional storage devices 106, the cluster settings collection logic 153 collects from the master node (e.g., master host device 102) an additional mapping of respective ones of the one or more additional storage devices 106 to respective ones of one or more additional pseudo storage device names, and the settings synchronization and communication logic 155 delivers the additional mapping to the remaining nodes of the cluster. The multi-pathing monitoring logic 156 further monitors the host devices 102 and the paths used during IO operations. The multi-pathing monitoring logic 156 also provides host-based email alerts, when there is a change in volume, path and bus states.

In illustrative embodiments, based on the settings of an identified master node, the multi-pathing management appliance 150 synchronizes settings of the nodes belonging to the same cluster. The settings of the master node are applied to the remaining nodes of the cluster, which may be considered as clients relative to the master node. As noted herein, a user via a user interface 152 can specify a master node. In addition, a user via the user interface 152 may trigger collection of the master node multi-pathing settings from the master node and delivery of the master node multi-pathing settings to the nodes of a cluster by inputting one or more instructions to the multi-pathing management appliance 150 to synchronize settings of nodes in a given cluster with those of a master node. In other embodiments, such collection and delivery of master node settings is performed at regular intervals (e.g., every second, minute, hour, etc.) by the multi-pathing management appliance 150.

As explained herein, the MPIO driver 112-1 can obtain from the multi-pathing management appliance 150 multi-pathing settings of a master node of a cluster for use in various operations performed at least in part by the MPIO driver 112-1. Host multi-pathing software can be used to implement a multi-path layer comprising MPIO drivers 112 of respective host devices 102 as well as related management appliance software such as the above-noted PPMA of multi-pathing management appliance 150. The multi-path layer illustratively comprises the MPIO driver 112-1 and in some embodiments can comprise a PPMA implemented by multi-pathing management appliance 150.

In the FIG. 1 embodiment, the storage array 105 comprises a plurality of storage controllers 120, IO operation priority queues 122 and response time control module 124. The response time control module 124 may be used to implement storage array-based adjustments in response time for particular IO operations based at least in part on service level objective (SLO) information stored by the storage array 105 in its persistent memory. The response time control module 124 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105. Process tags may be used in assigning different ones of the IO operations to different ones of the IO operation priority queues 122, as disclosed in U.S. Pat. No. 10,474,367, issued Nov. 12, 2019, and entitled "Storage System with Input-Output Performance Control Utilizing Application Process Detection," which is incorporated by reference herein.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

Information can be obtained by the host device 102-1 from the storage array 105, or information can be obtained by the storage array 105 from the host device 102-1 utilizing an in-band communication mechanism in which one or more predetermined commands in a designated storage protocol are sent from the host device 102-1 to the storage array 105 or vice versa. Such predetermined commands can comprise, for example, log sense and log select commands, a mode sense command, a VU command, or combinations of multiple instances of these or other commands, in an otherwise standardized command format, such as a SCSI format or other type of format.

Additionally or alternatively, information can be obtained by the host device 102-1 from the storage array 105, or information can be obtained by the storage array 105 from the host device 102-1 utilizing an out-of-band communication mechanism. For example, an out-of-band communication mechanism of this type can involve host management software of the host device 102-1 communicating with storage array management software of the storage array 105 over an IP network connection or other type of network connection.

These and other functions related to managing multi-pathing settings in a cluster environment that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 and/or multi-pathing management appliance 150 being configured to manage multi-pathing settings in a cluster environment are intended to be broadly construed, and should not be viewed as being limited to any particular storage arrangement, such as storage in a particular host device component or using a particular format. Accordingly, such storage can be in a memory or other storage device that is outside of the MPIO driver and/or multi-pathing management appliance.

Absent use of the techniques for managing multi-pathing settings in a cluster environment as disclosed herein, users control the collection of settings and mappings from one node and the application of the settings and mappings to each of the other nodes of a cluster. If there are a large number of nodes in a cluster (e.g., 32 to 64 nodes), such user control is prone to errors, especially if the settings are often changed, and input steps to update modified settings must be repeatedly performed on each of the nodes. In an example of conventional techniques, storage device (e.g., LUN) to pseudo name mappings from multi-pathing software on a cluster node are exported to a file (e.g., export_mappings -f map.file). A user initiates copying of the map.file to each of the other nodes, so that the mappings are imported on each of the other nodes from the file (e.g., import_mappings -f map.file). If settings are changed on any nodes, a user must make note of the changes and apply the changes on each of the other nodes.

Such drawbacks are advantageously overcome in illustrative embodiments herein by utilization of a multi-pathing management appliance 150 and a multi-path layer comprising one or more of the MPIO drivers 112 to manage multi-pathing settings in a cluster environment as described above. These embodiments therefore provide a significant advance over conventional configurations that are not equipped for managing multi-pathing settings in a cluster environment. For example, with multi-pathing software installed on all clustered nodes, the host devices in a cluster send their collected settings and cluster names to a multi-pathing management appliance, which groups host devices belonging to the same cluster, and synchronizes their settings based on the settings of an identified master node. Such embodiments are much more efficient and effective than conventional solutions that require user intervention to have consistent multi-pathing settings across nodes of a cluster. As an additional advantage, if a target storage port is scheduled for maintenance, a standby command for the corresponding target port from one node can be automatically applied to all clustered nodes, thereby eliminating the need for a user to login to each node and make required setting changes based on the unavailable target port.

The above-described functions associated with managing multi-pathing settings in a cluster environment in the MPIO driver 112-1 are carried out at least in part under the control of its path selection logic 114-1 and/or cluster settings logic 116-1. The above-described functions associated with managing multi-pathing settings in a cluster environment in the multi-pathing management appliance 150 are carried out at least in part under the control of its cluster settings collection logic 153, cluster identification logic 154, setting synchronization and communication logic 155 and multi-pathing monitoring logic 156.

For example, the cluster settings collection logic 153, cluster identification logic 154, setting synchronization and communication logic 155 and multi-pathing monitoring logic 156 are illustratively configured to control performance of an algorithm comprising the steps of the flow diagram to be described below in conjunction with FIG. 2. In other embodiments, one or more such steps can be more generally performed by the multi-pathing management appliance 150.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for managing multi-pathing settings in a cluster environment.

Accordingly, functionality described above in the context of the first MPIO driver 112-1 and the first host device 102-1 is assumed to be similarly performed by each of the other MPIO drivers 112-N and/or more generally by their respective host devices 102-N.

The MPIO drivers 112 may be otherwise configured utilizing well-known MPIO functionality such as that described in "Dell EMC SC Series Storage and Microsoft Multipath I/O," Dell EMC, CML 1004, July 2018, which is incorporated by reference herein. Such conventional MPIO functionality is suitably modified in illustrative embodiments disclosed herein to support managing multi-pathing settings in a cluster environment.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF. The multi-pathing management appliance 150 in some embodiments is similarly configured to communicate directly with the storage array 105 using one or more such storage access protocols.

In one or more embodiments, the multi-pathing management appliance 150 is an example of what is more generally referred to herein as an "intermediary device" coupled to the host devices 102 and the storage array 105, and is illustratively implemented as one or more servers. Other types of servers, computers, management appliances or other intermediary devices can be used in other embodiments in addition to or in place of the multi-pathing management appliance 150. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the multi-pathing management appliance 150.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105, and between the multi-pathing management appliance 150 and the host devices 102 or storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112, instances of path selection logic 114 and cluster settings logic 116, multi-pathing management appliance 150 and instances of cluster settings collection logic 153, cluster identification logic 154, setting synchronization and communication logic 155 and multi-pathing monitoring logic 156 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising a plurality of host devices, a storage system and at least one multi-pathing management appliance. The storage system in this embodiment is assumed to comprise at least one storage array having a plurality of storage devices. The storage devices can include logical storage devices such as LUNs or other logical storage volumes.

Figure 2:
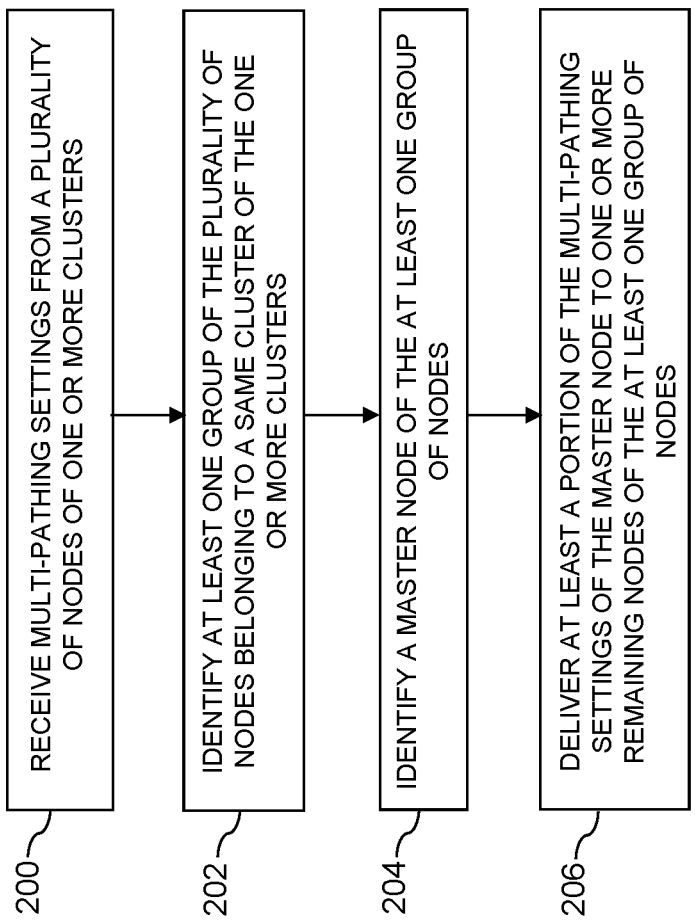
FIG. 2 is a flow diagram of a process for managing multi-pathing settings in a cluster environment in an illustrative embodiment.

The steps of the FIG. 2 process are illustratively performed at least in part by or under the control of a multi-pathing management appliance. For example, portions of the process may be carried out under the control of software, firmware and/or hardware of an instance of logic deployed within the multi-pathing management appliance. Accordingly, the FIG. 2 process may be viewed as an example of an algorithm performed by the cluster settings collection logic 153, cluster identification logic 154, setting synchronization and communication logic 155 and multi-pathing monitoring logic 156 of the multi-pathing management appliance 150. Other arrangements of other system components (e.g., MPIO driver 112-1 of host device 102-1) can be configured to perform at least portions of one or more of the steps in other embodiments.

In step 200, multi-pathing settings are received from a plurality of nodes of one or more clusters. According to an embodiment, the plurality of nodes comprise respective ones of a plurality of host devices. Each respective host device is configured to communicate over a network with a storage system, and comprises a multi-path input-output driver configured to control delivery of a plurality of IO operations from the host device to the storage system over selected ones of a plurality of paths through the network.

The multi-pathing settings received from respective ones of the plurality of nodes comprise a mapping of respective ones of a plurality of storage devices of the storage system to respective ones of a plurality of pseudo storage device names.

In step 202, at least one group of the plurality of nodes is identified as belonging to a same cluster of the one or more clusters. In the process, respective cluster identifiers are received from the plurality of nodes, and identifying the at least one group of group of nodes as belonging to the same cluster comprises assigning respective ones of the plurality of nodes having the same cluster identifier to the same cluster.

In steps 204 and 206, a master node of the at least one group of nodes is identified, and at least a portion of the multi-pathing settings of the master node are delivered to one or more remaining nodes of the at least one group of nodes. The master node multi-pathing settings comprise a mapping of respective ones of a plurality of storage devices of the storage system to respective ones of a plurality of pseudo storage device names as defined in the master node. In one or more embodiments, the master node multi-pathing settings further comprise at least one of an IO operation policy, a failover policy and a load balancing policy.

According to one or more embodiments, each multi-path input-output driver is configured to collect the multi-pathing settings corresponding to its host device, to collect a cluster identifier corresponding to its host device, and to apply the master node multi-pathing settings on its corresponding host device.

In an illustrative embodiment, the at least one group of nodes is polled to determine whether one or more target ports of the storage system is in standby mode, and notifications are sent to respective nodes of the at least one group of nodes that the one or more target ports is in standby mode responsive to an affirmative determination. Alternatively, an input is received indicating that one or more target ports of the storage system is in standby mode, and notifications are sent to respective nodes of the at least one group of nodes that the one or more target ports is in standby mode responsive to the received input.

In accordance with one or more embodiments, one or more additional storage devices added in the storage system are detected, and a mapping of respective ones of the one or more additional storage devices to respective ones of one or more pseudo storage device names is collected from the master node. The collected mapping is delivered to the remaining nodes of the at least one group of nodes.

Multiple additional instances of the FIG. 2 process may be performed in respective additional multi-pathing management appliances and/or host devices. Other embodiments can include multiple storage arrays, with the disclosed functionality for managing multi-pathing settings in a cluster environment being implemented in connection with each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving multi-pathing management appliances, host devices, storage systems and functionality for managing multi-pathing settings in a cluster environment. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement the disclosed functionality for managing multi-pathing settings in a cluster environment within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
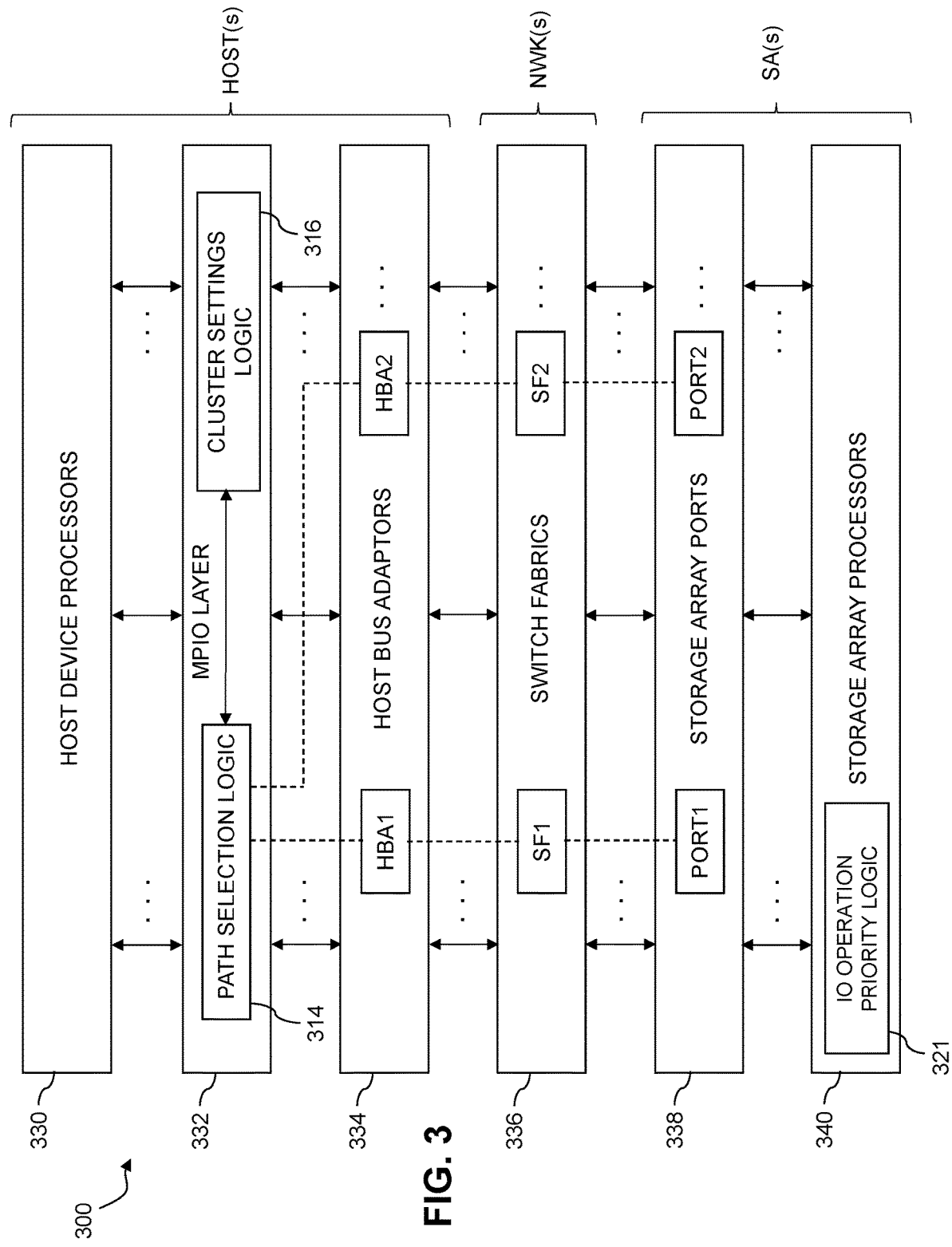
FIG. 3 is a block diagram showing multiple layers of a layered system architecture that includes a multi-path layer with functionality for managing multi-pathing settings in a cluster environment in an illustrative embodiment.

Referring now to FIG. 3, another illustrative embodiment is shown. In this embodiment, an information processing system 300 comprises one or more instances of path selection logic 314, cluster settings logic 316 and IO operation priority logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements management of multi-pathing settings in a cluster environment as characterized by cluster settings logic 316. The cluster settings logic 316 is illustratively shown as part of the MPIO layer 332. Alternatively, the cluster settings logic 316 in other embodiments is illustratively stored, at least partially, in the host device processor layer 330. It is also possible in some embodiments that the cluster settings logic 316 can be incorporated within a data structure of the path selection logic 314. The cluster settings logic 316 (or 116) illustratively collects multi-pathing software settings and a cluster identifier associated with its host device. The cluster settings logic 316 sends the collected settings and cluster identifier to a multi-pathing management appliance, which groups multiple host devices with the same cluster identifier as belonging to a given cluster. Based on the settings of an identified master node (e.g., master host device), the multi-pathing management appliance synchronizes settings of the nodes belonging to the same cluster. The settings of the master node are received by the cluster settings logic 316, and applied in connection with MPIO operations originating from its host device. The settings include, for example, storage device (e.g., LUN) to pseudo name mappings. In one or more embodiments, when new storage devices in a storage system are detected, the cluster settings logic 316 receives and applies updated master node multi-pathing settings corresponding to the new storage devices, including updated device to pseudo name mappings.

In addition, the cluster settings logic 316 is configured to receive an input indicating that a given target port (e.g., PORT1, PORT 2, etc.) is in standby mode. In response to a request from a multi-pathing management appliance, the cluster settings logic 316 supplies details of the given target port and its mode to the multi-pathing management appliance. The multi-pathing management appliance sends notifications to respective nodes of a cluster each including respective instances of cluster settings logic 316 that the one or more target ports is in standby mode. The respective instances of cluster settings logic 316 (or 116), in conjunction with path selection logic 314 (or 114), control path selection based on the information of which target ports are in standby mode. In addition, the cluster settings logic 316 (or 116), in conjunction with path selection logic 314 (or 114), controls path selection based on the multi-pathing settings of the master node.

The MPIO layer 332 is an example of what is also referred to herein as a multi-path layer, and comprises one or more MPIO drivers implemented in respective host devices. Each such MPIO driver illustratively comprises an instance of path selection logic 314 and cluster settings logic 316 configured to implement functionality for managing multi-pathing settings in a cluster environment substantially as previously described. Additional or alternative layers and path selection and/or cluster settings logic arrangements can be used in other embodiments.

The IO operation priority logic 321 implemented in the storage array processor layer 340 controls different levels of performance for IO operations. For example, the IO operation priority logic 321 provides different priority levels for different ones of the IO operations by assigning different ones of the IO operations to different IO operation priority queues. It is also possible in some embodiments that the IO operation priority logic 321 can include multiple distinct IO operation priority logic instances for multiple IO queues of respective ones of a plurality of host devices of the system 300.

In the system 300, path selection logic 314 is configured to select different paths for sending IO operations and/or commands from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations and/or commands to the one or more storage arrays having the storage array ports of the storage array port layer 338. In selecting the paths, the path selection logic 314 illustratively limits amounts of IO operations and/or commands that are delivered over one or more paths to particular ones of the ports of a storage array.

It is assumed in this embodiment that the host devices through their respective MPIO drivers and respective instances of path selection logic 314 and cluster settings logic 316 provide functionality for managing multi-pathing settings in a cluster environment, possibly with involvement of other host device components.

Accordingly, in some embodiments, the path selection logic 314 utilizes the cluster settings logic 316 in determining appropriate paths over which to send particular IO operations and/or commands to ports of one or more storage arrays. As described elsewhere herein, the management of multi-pathing settings in a cluster environment can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The particular features and functionality of the illustrative embodiments described above can be varied in other embodiments.

Figure 4:
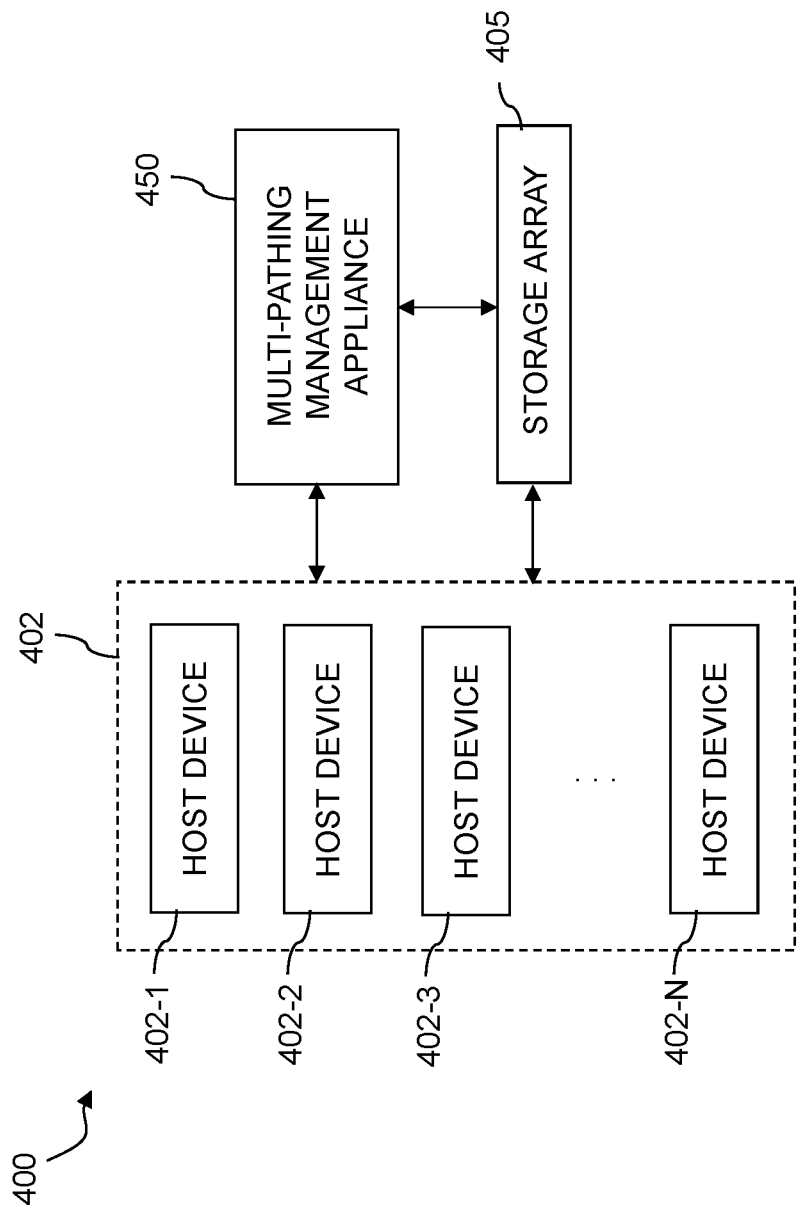
FIG. 4 is a block diagram illustrating an example interconnection arrangement between a multi-pathing management appliance, multiple host devices and a storage array in an illustrative embodiment.

Referring now to FIG. 4, an information processing system 400 in another illustrative embodiment comprises a plurality of host devices 402, individually denoted as host device 402-1, host device 402-2, host device 402-3, . . . host device 402-N. The system 400 further comprises a storage array 405, and a multi-pathing management appliance 450. It is assumed that each of the host devices 402 is in communication with the storage array 405 and the multi-pathing management appliance 450. In a process for managing multi-pathing settings in a cluster environment in system 400, the multi-pathing management appliance 450 illustratively obtains cluster identifiers and multi-pathing settings (e.g., storage device to pseudo name mappings, multi-pathing policies, etc.) from the host devices 402, and identifies at least one cluster comprising a group of the host devices 402 having the same cluster identifier. In addition, the multi-pathing management appliance 450 identifies a master node (e.g., master host device) of the identified cluster and delivers the multi-pathing settings of the master node to each of the remaining nodes of the cluster. The host devices 402 include logic to apply the received master node multi-pathing settings in IO operations so that the settings are the same between all nodes of a given cluster.

In one or more embodiments, the multi-pathing management appliance 450 is configured to detect new storage devices (e.g., LUNs) added to the storage array 405 and retrieve updated settings comprising updated device to pseudo name mappings from the master node based on the new storage devices. The multi-pathing management appliance 450 is configured to automatically deliver the updated master node settings to the other cluster nodes so that the updated settings can be applied by the cluster host devices in IO operations. Additionally, based on status information of ports of the storage array 405 inputted to one or more of the host devices 402 and/or to the multi-pathing management appliance 450, the multi-pathing management appliance 450 supplies the port status information to each of the cluster nodes, which may affect path selection performed by the host devices 402 in a cluster during IO operations.

The above-described processes, algorithms and other features and functionality disclosed herein are presented by way of illustrative example only, and other embodiments can utilize additional or alternative arrangements. For example, other types of intermediary devices can be used in place of the multi-pathing management appliance 450, such as various alternative arrangements of servers, appliances and/or computers.

Also, as mentioned previously, different instances of the above-described algorithms and other multi-pathing settings management techniques for cluster environments can be performed by different MPIO drivers in different host devices.

The particular multi-pathing settings management arrangements described above are therefore presented by way of illustrative example only. Numerous alternative arrangements of these and other features can be used in implementing the multi-pathing settings management functionality in other illustrative embodiments.

The illustrative embodiments disclosed herein can provide a number of significant advantages relative to conventional arrangements that fail to provide management of multi-pathing settings in cluster environments. Advantageously, the embodiments configure a multi-pathing management appliance and a multi-path layer of one or more host devices to include functionality for managing multi-pathing settings in a cluster environment, leading to enhanced overall performance and more efficient use of computing resources. These embodiments provide a significant advance over conventional techniques, which do not configure a multi-pathing management appliance to control synchronization of multi-pathing settings between all clustered host devices. As clusters continue to increase in size and their management becomes more difficult, the embodiments improve current techniques through use of a multi-pathing management appliance, which identifies host devices in a cluster, and supplies multi-pathing settings of a master cluster node to all nodes in the cluster, so that settings can be consistent between the cluster nodes.

Absent the techniques of the embodiments, users are required to control the transfer of common settings to each node of a cluster by exporting LUN to pseudo name mappings from one node to a file, and initiating copying of the file to each of the remaining nodes in the cluster. If settings are changed on any nodes, if storage devices are added and/or if target ports are disabled, a user must make note of these events and apply any modifications related to the events on each of the other nodes. Advantageously, cluster host devices collect their settings and cluster identifiers, which are supplied to a management appliance. The management appliance identifies the host devices in a given cluster and, based on settings of an identified master node, automatically synchronizes settings of the nodes belonging to the same cluster by delivering the master node settings to each of the host devices in the cluster. The host devices include logic to receive and apply the master node settings to maintain consistency of settings between cluster nodes. The embodiments, therefore, avoid piecemeal settings configurations and/or modifications to each clustered node, which are controlled by a user and prone to error.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104, storage array 105 and multi-pathing management appliance 150 are illustratively implemented in the form of software running on one or more processing devices. As a more particular example, the instances of path selection logic 114, cluster settings logic 116, cluster settings collection logic 153, cluster identification logic 154, settings synchronization and communication logic 155 and multi-pathing monitoring logic 156 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, cluster settings logic, cluster settings collection logic, cluster identification logic, setting synchronization and communication logic, multi-pathing monitoring logic and additional or alternative components. Also, the particular configurations of system and device elements and associated processing operations illustratively shown in the drawings can be varied in other embodiments. For example, a wide variety of different MPIO driver configurations and associated multi-pathing setting management arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
wherein the at least one processing device comprises a multi-pathing management appliance and is configured:
to receive multi-pathing settings from a plurality of nodes of one or more clusters, wherein the plurality of nodes comprise respective ones of a plurality of host devices, each respective host device being configured to communicate over a network with a storage system;
to identify at least one group of the plurality of nodes belonging to a same cluster of the one or more clusters;
to identify a master node of the at least one group of nodes;
to deliver at least a portion of the multi-pathing settings of the master node to one or more remaining nodes of the at least one group of nodes;
to poll respective nodes of the at least one group of nodes to determine whether one or more target ports of a plurality of target ports of the storage system are in standby mode, wherein the polling comprises collecting target port status information from the respective ones of the plurality of host devices belonging to the same cluster;
to determine from the collected target port status information from the respective ones of the plurality of host devices belonging to the same cluster that at least one target port of the plurality of target ports is in standby mode; and
to send notifications from the multi-pathing management appliance to the respective nodes of the at least one group of nodes that the at least one target port of the plurality of target ports is in standby mode;
wherein the respective nodes of the at least one group of nodes are configured to operate in accordance with a same mode for the at least one target port based at least in part on the notifications from the multi-pathing management appliance.

2. The apparatus of claim 1 wherein each respective host device comprises a multi-path input-output driver configured to control delivery of a plurality of input-output operations from the host device to the storage system over selected ones of a plurality of paths through the network.

3. The apparatus of claim 2 wherein the multi-pathing settings received from respective ones of the plurality of nodes comprise a mapping of respective ones of a plurality of storage devices of the storage system to respective ones of a plurality of pseudo storage device names.

4. The apparatus of claim 2 wherein the portion of the multi-pathing settings of the master node comprises a mapping of respective ones of a plurality of storage devices of the storage system to respective ones of a plurality of pseudo storage device names.

5. The apparatus of claim 4 wherein the portion of the multi-pathing settings of the master node further comprises at least one of an input-output operation policy, a failover policy and a load balancing policy.

6. The apparatus of claim 2 wherein each multi-path input-output driver is further configured:
to collect the multi-pathing settings corresponding to its host device; and
to collect a cluster identifier corresponding to its host device.

7. The apparatus of claim 2 wherein each multi-path input-output driver is further configured to apply the portion of the multi-pathing settings of the master node on its corresponding host device.

8. The apparatus of claim 1 wherein the at least one processing device is further configured:
to receive an input indicating that one or more additional target ports of the storage system are in standby mode; and
to send additional notifications to the respective nodes of the at least one group of nodes that the one or more additional target ports are in standby mode.

9. The apparatus of claim 1 wherein:
the at least one processing device is further configured to receive respective cluster identifiers from the plurality of nodes; and
in identifying the at least one group of group of nodes, the at least one processing device is configured to assign respective ones of the plurality of nodes having a same cluster identifier to the same cluster.

10. The apparatus of claim 1 wherein the portion of the multi-pathing settings of the master node comprises a mapping of respective ones of a plurality of storage devices of the storage system to respective ones of a plurality of pseudo storage device names.

11. The apparatus of claim 10 wherein the at least one processing device is further configured:
to detect one or more additional storage devices in the storage system;
to collect from the master node an additional mapping of respective ones of the one or more additional storage devices to respective ones of one or more additional pseudo storage device names; and
to deliver the additional mapping to the one or more remaining nodes of the at least one group of nodes.

12. A computer program product comprising a non-transitory processor-readable storage medium having stored therein program code of one or more software programs, wherein the program code, when executed by at least one processing device comprising a multi-pathing management appliance and a processor coupled to a memory, causes the at least one processing device:

to receive multi-pathing settings from a plurality of nodes of one or more clusters, wherein the plurality of nodes comprise respective ones of a plurality of host devices, each respective host device being configured to communicate over a network with a storage system;

to identify at least one group of the plurality of nodes belonging to a same cluster of the one or more clusters;

to identify a master node of the at least one group of nodes;

to deliver at least a portion of the multi-pathing settings of the master node to one or more remaining nodes of the at least one group of nodes;

to poll respective nodes of the at least one group of nodes to determine whether one or more target ports of a plurality of target ports of the storage system are in standby mode, wherein the polling comprises collecting target port status information from the respective ones of the plurality of host devices belonging to the same cluster;

to determine from the collected target port status information from the respective ones of the plurality of host devices belonging to the same cluster that at least one target port of the plurality of target ports is in standby mode; and to send notifications from the multi-pathing management appliance to the respective nodes of the at least one group of nodes that the at least one target port of the plurality of target ports is in standby mode;

wherein the respective nodes of the at least one group of nodes are configured to operate in accordance with a same mode for the at least one target port based at least in part on the notifications from the multi-pathing management appliance.

13. The computer program product of claim 12 wherein each respective host device comprises a multi-path input-output driver configured to control delivery of a plurality of input-output operations from the host device to the storage system over selected ones of a plurality of paths through the network.

14. The computer program product of claim 13 wherein the portion of the multi-pathing settings of the master node comprises a mapping of respective ones of a plurality of storage devices of the storage system to respective ones of a plurality of pseudo storage device names.

15. The computer program product of claim 12 wherein the program code further causes the at least one processing device:

to determine from polling a first node of the at least one group of nodes that a first target port of the plurality of target ports is in standby mode;

to determine from polling a second node of the at least one group of nodes that a second target port of the plurality of target ports is in standby mode; and to send notifications to the respective nodes of the at least one group of nodes that the first and second target ports are in standby mode.

16. The computer program product of claim 12 wherein the program code further causes the at least one processing device:

to receive an input indicating that one or more additional target ports of the storage system are in standby mode; and to send additional notifications to the respective nodes of the at least one group of nodes that the one or more additional target ports are in standby mode.

17. A method comprising:

receiving multi-pathing settings from a plurality of nodes of one or more clusters wherein the plurality of nodes comprise respective ones of a plurality of host devices, each respective host device being configured to communicate over a network with a storage system;

identifying at least one group of the plurality of nodes belonging to a same cluster of the one or more clusters;

identifying a master node of the at least one group of nodes;

delivering at least a portion of the multi-pathing settings of the master node to one or more remaining nodes of the at least one group of nodes;

polling respective nodes of the at least one group of nodes to determine whether one or more target ports of a plurality of target ports of the storage system are in standby mode, wherein the polling comprises collecting target port status information from the respective ones of the plurality of host devices belonging to the same cluster;

determining from the collected target port status information from the respective ones of the plurality of host devices belonging to the same cluster that at least one target port of the plurality of target ports is in standby mode; and sending notifications from a multi-pathing management appliance to the respective nodes of the at least one group of nodes that the at least one target port of the plurality of target ports is in standby mode;

wherein the respective nodes of the at least one group of nodes are configured to operate in accordance with a same mode for the at least one target port based at least in part on the notifications from the multi-pathing management appliance; and wherein the method is performed by at least one processing device comprising the multi-pathing management appliance and a processor coupled to a memory.

18. The method of claim 17 wherein each respective host device comprises a multi-path input-output driver configured to control delivery of a plurality of input-output operations from the host device to the storage system over selected ones of a plurality of paths through the network.

19. The method of claim 18 wherein the portion of the multi-pathing settings of the master node comprises a mapping of respective ones of a plurality of storage devices of the storage system to respective ones of a plurality of pseudo storage device names.

20. The method of claim 17 further comprising:

receiving an input indicating that one or more additional target ports of the storage system are in standby mode; and sending additional notifications to the respective nodes of the at least one group of nodes that the one or more additional target ports are in standby mode.

* * * * *